Figure 4:
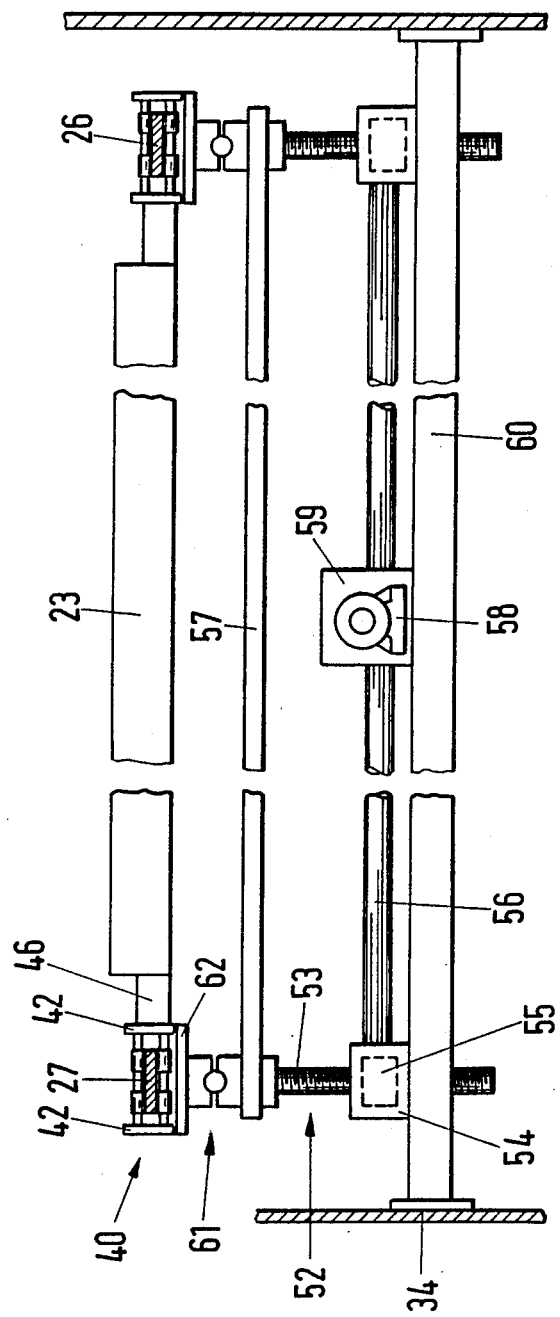

United States Patent [19]

Inselmann

[11] Patent Number: 4,923,560
[45] Date of Patent: May 8, 1990

[54] APPARATUS FOR CONNECTING SHEET-LIKE TEXTILE ARTICLES OR WEBS OF MATERIAL

[75] Inventor: Jürgen Inselmann, Löhne, Fed. Rep. of Germany

[73] Assignee: Herbert Kannegiesser GmbH & Co., Vlotho, Fed. Rep. of Germany

[21] Appl. No.: 254,643

[22] Filed: Oct. 7, 1988

[30] Foreign Application Priority Data

Oct. 9, 1987 [DE] Fed. Rep. of Germany ....... 3734279

[51] Int. Cl.⁵ .......................... B30B 5/06; B30B 15/34
[52] U.S. Cl. .................... 156/555; 100/93 P; 100/93 RP; 100/154; 156/583.5; 156/583.91
[58] Field of Search ................. 156/555, 583.5, 583.3, 156/583.91, 583.1; 100/93 P, 93 RP, 154; 425/371

[56] References Cited

U.S. PATENT DOCUMENTS 3,942,929  3/1976  De Mets ............................. 425/371
4,560,431  12/1985  Inselmann ........................ 156/583.5
4,647,417  3/1987  Böttger et al. .................... 156/583.5

FOREIGN PATENT DOCUMENTS 3303504  12/1985  Fed. Rep. of Germany .
3502608  6/1988  Fed. Rep. of Germany .
3724011  2/1989  Fed. Rep. of Germany .

Primary Examiner—Michael Wityshyn
Attorney, Agent, or Firm—Sughrue, Mion, Zinn, Macpeak & Seas

[57] ABSTRACT

Apparatus for connecting sheet-like textile articles or webs of material.

The processing of different materials in apparatuses with heating plates of constant curvature has hitherto, whenever the material to be processed has been changed, required a corresponding exchange of the heating plates in order to ensure the best possible processing of the material as a result of a more or less pronounced curvature of these. The new apparatus of the invention makes this exchange of the heating plates unnecessary by providing a heating plate which is composed of individual hollow-section heating bodies and which is connected to a supporting trestle on which lifting members act in order to adjust the curvature. As a result of this arrangement, the curvature of the heating plate can be adjusted in a reproducible way and thus adapted to the particular requirements, even during operation.

19 Claims, 4 Drawing Sheets

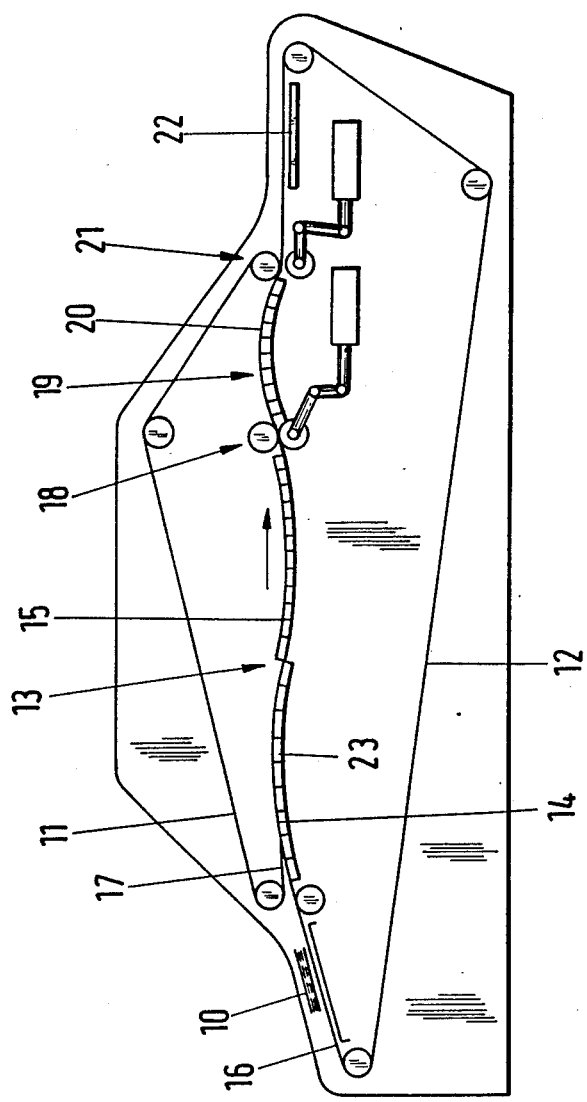

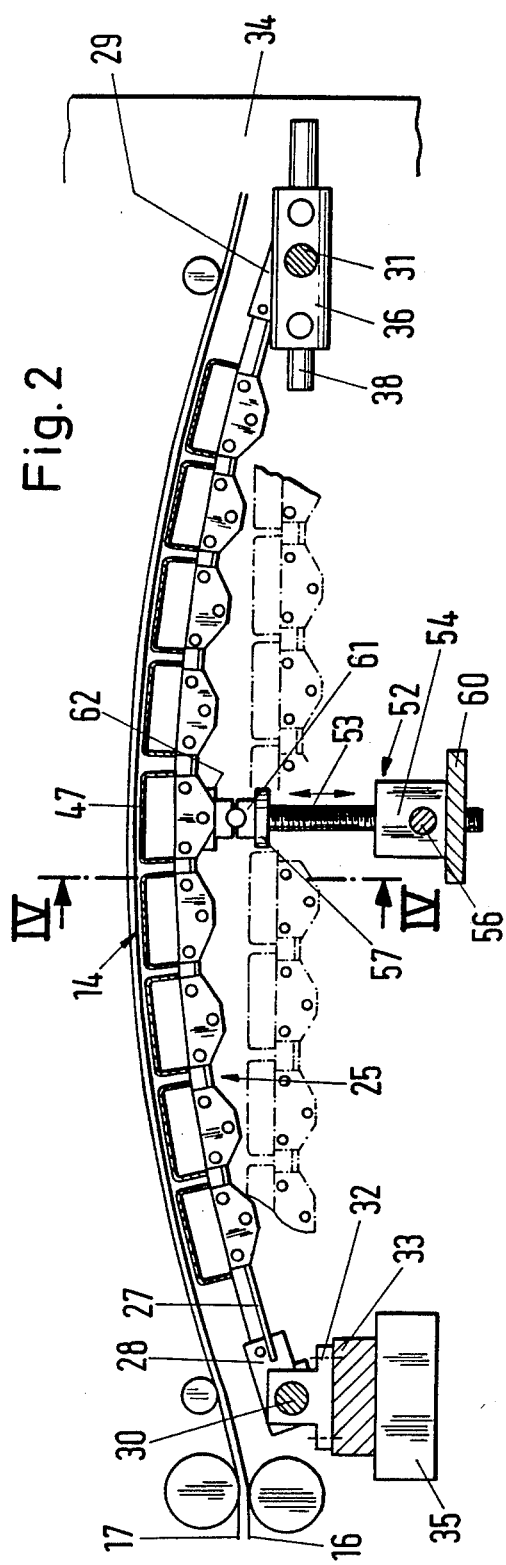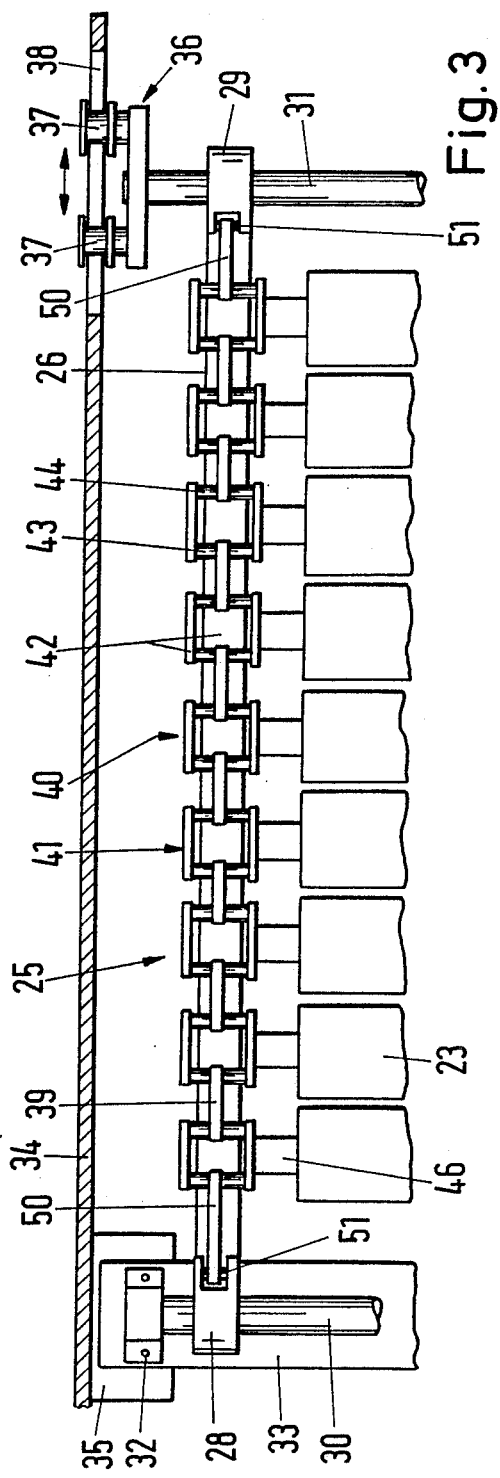

Fig. 5
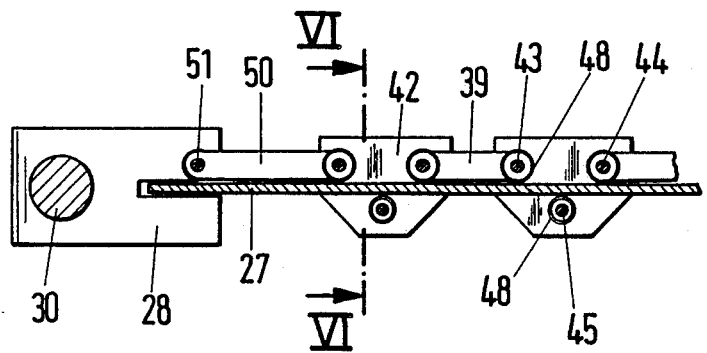
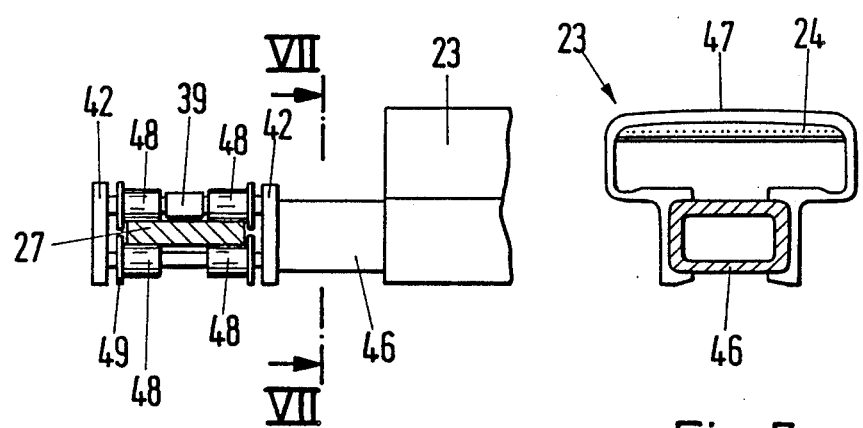
Fig. 6
Fig. 7

APPARATUS FOR CONNECTING SHEET-LIKE TEXTILE ARTICLES OR WEBS OF MATERIAL

DESCRIPTION

The invention relates to an apparatus for connecting sheet-like textile articles, especially for the adhesive bonding of outer fabrics and linings for garments (bonding press) or for laminating at least one web of nonsoftening film-like material, substrate or the like with at least one web of preferably thermoplastic film (laminating machine), with a heating station having at least one curved heating plate and with conveyor belts, between which are conveyable the sheet-like textile articles or webs to be connected, which are guided over the heating plate under tension.

An apparatus of this type is known from German Patent Specification 3,303,504, and in it two curved heating plates located behind one another in the direction of transport are arranged on both sides of the transport plane. The heating plates consist of several (hollow-section) heating bodies which are arranged next to one another and which are arranged relative to one another in such a way that a continuous curvature of the heating plate is obtained.

The sheet-like articles to be connected to one another, in particular individual (textile) articles or continuous webs of material, are conveyed over and beyond the heating plates by conveyor belts. As a result of the predetermined belt tension, in the region of the heating plates the conveyor belts rest against these under tension. Likewise, pressure is exerted on the articles or webs to be bonded together which lie between the conveying sides of the conveyor belts.

For articles and webs of different materials, that is to say for various textiles, plastics, natural products, etc., different pressing forces are required during the bonding operation. The thickness of the articles or webs and their shape must also be taken into account at the same time. In the known bonding presses, the pressing forces are set as a result of the tension in the conveyor belts, specifically by varying the relative position of deflecting members of the conveyor belts.

The object on which the invention is based is to develop further and improve an apparatus of the type mentioned in the introduction, to the effect that it can be adapted in a simple way to the processing of different materials, in particular as a result of an individual and exact adjustment of the pressing force for the articles and webs.

To achieve this object, the apparatus according to the invention is characterized in that the curvature of the heating plate or heating plates is adjustable for varying the pressing force of the conveyor belts against one another.

The invention is based on the finding that the tension within the conveyor belts and consequently also the pressing force for the sheet-like articles conveyed between them are influenced by the shape of the heating plates. By varying the curvature of the heating plates between a plane shape on the one hand and a very pronounced curve on the other hand, it is possible to obtain a rapid and accurate variation of the tension in the conveyor belts and consequently an adaptation of the apparatus to different materials. An increase in the curvature of the heating plate causes a raising and a decrease in the curvature of the heating plate a lowering of the pressing force for the articles to be bonded together.

The present invention can be used both in bonding presses, as described in German Patent Specification 3,303,504, and in laminating machines in the design according to German Patent Application P 37 24 011.0. The invention is applicable to heating plates which are produced from a continuous plate, but especially advantageously to heating plates which are composed of individual elements. The construction of the heating plate from individual heating elements arranged next to one another makes it possible to change the curvature of these in a simple way by changing the relative position of the individual heating elements in relation to one another, since no deformation resistance opposes a change of the curvature.

According to a further feature of the invention, the heating plate is arranged on a supporting trestle which consists of preferably two parallel longitudinal members designed especially as leaf springs. The leaf springs are connected by means of end pieces to rotary rods which are mounted fixed in place and so as to be longitudinally displaceable respectively. The change of curvature of the heating plate is made indirectly as a result of a change of the curvature of the leaf springs. Because leaf springs are used as longitudinal members, the supporting trestle is under prestress, thus allowing an exact adjustment of the curvature and a high reproducibility of this.

According to the invention, the individual hollow-section heating bodies are connected to one another by means of a tensioned member, in particular a roller chain, which matches the curvature. In order to couple the heating plate consisting of individual hollow-section heating bodies to the leaf springs, the latter extend within the roller chains which are connected to the end pieces of the leaf springs by means of end straps.

Further features of the invention relate to the arrangement and design of the lifting members required for adjusting the curvature of the heating plates and to the arrangement and design of their drive. The lifting members can be arranged both below and above the heating plate.

The invention is described below by means of an exemplary embodiment in conjunction with a drawing. In this:

FIG. 1 shows a diagrammatic longitudinal section through an apparatus for the bonding of sheet-like textile articles, FIG. 2 shows a longitudinal section through a heating plate of FIG. 1 on an enlarged scale, FIG. 3 shows a lateral region of a heating plate of FIG. 1 in a plan view and on an enlarged scale, FIG. 4 shows a cross-section through a heating plate along the sectional line IV—IV of FIG. 2, FIG. 5 shows a detail of the mounting of the heating plate in a side view and in longitudinal section and on an enlarged scale, FIG. 6 shows a cross-section along the sectional line VI—VI of FIG. 5, FIG. 7 shows a cross-section along the sectional line VII—VII of FIG. 6.

The following description describes by way of example how textile articles 10 partially coated with adhesive are processed in a bonding press. The apparatus corresponds essentially to that described in German Offenlegungsschrift 3,502,608 according to FIG. 1. In this, the textile articles 10 to be bonded together are delivered by the conveyor belts 11, 12 to a heating station 13. In the exemplary embodiment illustrated, this consists of two heating plates 14 and 15 which are arranged in succession in the conveying direction. In the region of the heating plates 14, 15, conveying sides 16 and 17 are heated and guided under tension past the surfaces of the curved heating plates. As a result of pressure and temperature which are transmitted by the conveying sides 16, 17 to the textile articles 10 arranged between them, the latter are bonded together.

The heating station 13 is followed by a linear pressure device 18 which is followed, in turn, by a surface pressure device 19, as can be taken from German Offenlegungsschrift 3,502,608, with a pressure plate 20. The pressure plate 20 is curved to the pattern of the heating plates 14, 15, in such a way that the conveying sides 16, 17 rest with tension against the surface of the pressure plate 20 and thereby exert an increased pressing force or surface pressure on the conveyed textile articles 10.

A further linear pressure device 21 and a cooling plate 22 of a design known per se follow along the further transport path.

The particular feature of the apparatus is the possibility of varying the curvature of the heating plates 14, 15 as a result of controlled adjustment. Because of the proportional relationship between the degree of curvature of the heating plates 14, 15 and the pressing force, it is thus possible to influence the pressing force directly.

The heating plates 14, 15 are composed of individual hollow-section heating bodies 23 containing a panel-type heating body 24, as described in German Offenlegungsschrift 3,303,504, and they are arranged on a supporting trestle 25. The pressure plate 20 already mentioned can likewise be composed of such hollow-section heating bodies 23. The supporting trestle 25 consists of two leaf springs 26, 27 arranged parallel in one plane and guided in end pieces 28, 29. For varying the curvature of the heating plate 14, 15 fixed in place, it is necessary for the end pieces 28 at one end of the leaf springs 26, 27 to be fixed in place and for the end pieces 29 at the other end of the leaf springs 26, 27 to be displaceable. For this purpose, the end pieces 28, 29 are mounted pivotably on rotary rods 30, 31, one rotary rod 30 being connected firmly at its ends to the crossmember 33 by means of fixing devices 32. The crossmember 33 is supported at its ends on two blocks 35 connected to the side walls 34 of the apparatus. The two ends of the other rotary rod 31 terminate fixedly in terms of rotation in roller guides 36 which, by means of guide rollers 37 mounted on them, are positively guided in corresponding guide slots 38 in the side walls 34 of the apparatus.

The hollow-section heating bodies 23 are arranged transversely between the two leaf springs 26, 27 and are connected to one another by means of connecting straps 39. The connecting straps 39 are, at the same time, elements of a roller chain 40 and connect its individual chain links 41 to one another. The leaf springs 26, 27 extend within the chain links 41 and thus within the roller chain 40. The chain links 41 are composed essentially of two guide straps 42 and three bolts 43, 44 and 45. Bolts 43, 44 and 45 are arranged in such a way that the bolts 43 and 44 are mounted above the leaf springs 26, 27 and the bolt 45 is mounted below the leaf springs 26, 27. For the rigid connection of the hollow-section heating bodies 23 to respective chain links 41, supporting sections 46 stabilizing the hollow-section heating bodies 23 produced preferably from extruded aluminium hollow-section bars are welded on the end face to respective guide straps 42 of a chain link 41. The two bolts 43, 44 of a chain link 41 which are mounted above the leaf springs 26, 27 are oriented in such a way that they extend in the longitudinal direction of the hollow-section heating body 23 and in a plane parallel to a working face 47 of a hollow-section heating body 23. The bolt 45 arranged below the leaf springs 26, 27 centrally in relation to the two upper bolts 43, 44 has a sufficiently large transverse offset to ensure that rollers 48 mounted on the bolts 43, 44, 45 can roll on both sides of the leaf springs 26, 27 without jamming.

Two rollers 48 are mounted on each of the bolts 43, 44, 45 and, at their ends pointing towards the guide straps 42, have a guide collar 49 for axial retention.

The ends of the roller chain 40 are connected to the end pieces 28, 29 of the leaf springs 26, 27 by means of end straps 50. Both the connecting straps 39 and the end straps 50 are respectively connected in an articulated manner (pivotably) to the bolts 43, 44 arranged above the leaf springs 26, 27 or to the bolts 51 which are arranged correspondingly in the end pieces 28, 29 and on which two rollers 48 are likewise mounted.

In order to vary the curvature of the heating plate 14, 15, that is to say deform the leaf springs 26, 27, a lifting member 52 acts centrally on each leaf spring. The lifting member 52 consists of a lifting spindle 53 and of a lifting-spindle guide 54 with an integrated deflecting gear 55 (bevel gear). At the same time, the deflecting gear performs the function of transmitting the torque of a drive spindle 56 to the lifting spindle 53. In order to ensure that the lifting spindles 53 are advanced in the same direction, one lifting spindle 53 is made left-handed and the other one right-handed. When the heating plate 14, 15 is subjected to load, the lifting spindles 53 are prevented from moving aside laterally by a supporting strut 57. The supporting strut 57 couples the two lifting spindles 53 to one another, both remaining freely rotatable. The drive spindle 56 is driven via an electric motor 58, the torque of which is transmitted to the drive spindle 56 via a deflecting gear 59 (bevel gear). The entire arrangement for lifting adjustment, consisting of the two lifting members 52 together with the lifting spindles 53 and the lifting spindle guides 54, the supporting strut 57, the drive spindle 56, the deflecting gears 55, 59 and the electric motor 58, is supported on the crossmember 60 connected to the side walls.

Arranged between the lifting members 52 and the leaf springs 26, 27 are thrust bearings 61 which transmit the advance of the lifting spindles 53, uncoupled from the rotary movement, to the middle chain links 41 of the respective roller chains 40 via thrust pieces 62. The transmission of force to the leaf springs 26, 27 thus takes place via the rollers 48 of the lower bolt 45 of the respective chain link 41.

A further use of the apparatus described can also be in the region of cooling of stabilizing zones of a bonding press of the type mentioned in the introduction.

I claim:

1. Apparatus for connecting sheet-like textile articles or webs and comprising a heating station having at least one curved heating plate, and conveyor belts between which are conveyable the sheet-like textile articles or webs to be connected, which belts are guided over the heating plate under tension, said apparatus characterized in that:

the curvature of the heating plate (14, 15) is adjustable for varying a pressure force of the conveyor belts (11, 12) against one another;

the heating plate (14, 15) consists of individual heating elements in the form of hollow-section heating bodies (23) which are arranged next to one another, and the relative position of which in relation to one another is variable for varying the curvature;

the heating plate (14, 15) is arranged on a supporting trestle (25) having a curvature which is variable: and the supporting trestle (25) comprises two parallel longitudinal members (26, 27) which are arranged at a distance from one another, on which the heating plate (14, 15) rests, and which are deformable so that their curvature is thereby varied.

2. Apparatus according to claim 1 characterized in that the longitudinal members are longitudinal leaf springs (26, 27).

3. Apparatus according to claim 2, characterized in that the longitudinal leaf springs (26, 27) are supported at opposite ends thereof on respective pivotally mounted end pieces (28, 29) one end piece (28) of each longitudinal leaf spring (26, 27) being mounted fixed in place and the other end piece (29) of each longitudinal leaf spring being mounted so as to be displaceable in the longitudinal direction of the leaf spring.

4. Apparatus according to claim 3, characterized in that the end pieces (28, 29) of the longitudinal leaf springs (26, 27) are mounted pivotally on two rotary rods (30, 31) transversely directed relative to the longitudinal leaf springs.

5. Apparatus according to claim 4, characterized in that one of the rotary rods (30) is guided fixed in place and the other rotary rod (31) is guided so as to be displaceable in the longitudinal direction of said leaf springs, and for the longitudinally displaceable guidance of the other rotary rod (31) there are mounted on opposite ends thereof roller guides (36) which run in corresponding guide slots (38) in stationary side walls (34) of the apparatus.

6. Apparatus according to claim 2, characterized in that the hollow-section heating bodies (23) forming the heating plate (14, 15) are arranged on the longitudinal leaf springs (26, 27) transversely relative thereto and are connected to said leaf springs so as to be displaceable in the longitudinal direction of said leaf springs.

7. Apparatus according to claim 6, characterized in that the leaf springs (26, 27) extend laterally outside the region of the heating plate (14, 15), the heating plate (14, 15) being connected to the leaf springs (26, 27) in such a way that it follows their deformations.

8. Apparatus according to claim 3, characterized in that the hollow-section heating bodies (23) of the heating plate (14, 15) are connected to one another in an articulated manner by means of connecting straps (39).

9. Apparatus according to claim 8, characterized in that the connecting straps (39) are elements of roller chains (40) which make the connection between the hollow-section heating bodies (23) and the longitudinal leaf springs (26, 27), the longitudinal leaf springs (26, 27) extending within the roller chains (40) in such a way that each heating body (23) is connected to the longitudinal leaf springs (26, 27) by means of the roller chain (40) so as to be displaceable in the longitudinal direction of said leaf springs.

10. Apparatus according to claim 9, characterized in that the roller chains (40) are articulated on the end pieces (28, 29) of the longitudinal leaf springs (26, 27) by means of end straps (50).

11. Apparatus according to claim 9, characterized in that the roller chains (40) have chain links (41) with two inner guide straps (42) connected by means of three bolts (43, 44, 45), on which rollers (48) are mounted.

12. Apparatus according to claim 11, characterized in that individual ones of said hollow-section heating bodies (23) are connected at their ends to the roller chains (40) by end faces of supporting sections (46) for stabilizing the hollow-section heating bodies (23) connected rigidly to the inner guide straps (42) of the roller chains (40).

13. Apparatus according to claim 11, characterized in that two of said three bolts (43, 44) are arranged above and the third of said three bolts (45) below a respective said leaf spring (26, 27), in such a way that the three bolts (43, 44, 45) mark corner points of an isosceles triangle of which the base defined by the two upper bolts (43, 44) is parallel to a working face (47) of each hollow-section heating body (23), and in that the rollers (48) mounted on the upper bolts (43, 44), guide individual ones of said hollow-section heating bodies (23) on the leaf springs (26, 27).

14. Apparatus according to claim 2, characterized in that extendable and retractable lifting members (52) are provided for changing the curvature of the heating plate (14, 15).

15. Apparatus according to claim 14, characterized in that the lifting members (52) are arranged underneath the heating plate (14, 15) and have lifting spindles (53) intended for adjusting the lifting height and causing a deformation of the leaf springs (26, 27).

16. Apparatus according to claim 15, characterized in that the lifting spindles (53) act via thrust bearings (61) on the leaf springs (26, 27), in the middle region of the latter.

17. Apparatus according to claim 15, characterized in that the lifting spindles (53) are connected to one another by means of a supporting strut (57), in such a way that the lifting spindles (53) are freely rotatable.

18. Apparatus according to claim 15, characterized in that the lifting spindles (53) of the lifting members (52) are driven by a central adjusting drive comprising an electric motor (58) which drives the lifting spindles (53) of the lifting members (52) via a drive spindle (56).

19. Apparatus according to claim 18, characterized in that deflecting gears (55, 59) are arranged between the electric motor (58) and the drive spindle (56), on the one hand, and between the drive spindle (56) and the lifting spindles (53) on the other hand.

* * * * *